United States Patent
Mizumoto et al.

(10) Patent No.: US 6,444,719 B1
(45) Date of Patent: Sep. 3, 2002

(54) METHOD FOR PRODUCING CRYSTALLINE METHACRYLIC RESIN AND PLASTIC FOAM

(75) Inventors: Tomohiro Mizumoto; Masahiko Moritani; Norio Sugimura, all of Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/529,012

(22) PCT Filed: Jul. 23, 1999

(86) PCT No.: PCT/JP99/03953

§ 371 (c)(1),
(2), (4) Date: Apr. 6, 2000

(87) PCT Pub. No.: WO00/08091

PCT Pub. Date: Feb. 17, 2000

(30) Foreign Application Priority Data

Aug. 6, 1998 (JP) .............................. 10-222873

(51) Int. Cl.[7] .......................... B29C 44/02; C08F 6/00
(52) U.S. Cl. ........................ 521/149; 521/97; 525/191; 264/50
(58) Field of Search .............................. 264/50; 521/97, 521/149; 525/191

(56) References Cited

U.S. PATENT DOCUMENTS

| | | | | |
|---|---|---|---|---|
| 3,607,988 A | * | 9/1971 | Gardner et al. ............. | 525/228 |
| 4,473,665 A | * | 9/1984 | Martin-Vvedensky et al. ... | 264/50 |
| 4,761,256 A | * | 8/1988 | Hardenbrook et al. ........ | 264/50 |
| 5,158,986 A | * | 10/1992 | Cha et al. ..................... | 521/82 |
| 5,160,674 A | * | 11/1992 | Colton et al. ................. | 264/50 |
| 5,271,886 A | * | 12/1993 | Collom et al. ................. | 264/50 |
| 5,684,055 A | * | 11/1997 | Kumar et al. ................. | 264/50 |
| 5,955,511 A | * | 9/1999 | Handa et al. ................. | 264/50 |

FOREIGN PATENT DOCUMENTS

| | | |
|---|---|---|
| JP | 47-14834 | 5/1972 |
| JP | 03-244651 | 10/1991 |
| JP | 04-225009 | 8/1992 |
| JP | 05-287032 | 11/1993 |
| JP | 06-332176 | 12/1994 |
| JP | 07-242705 | 9/1995 |

OTHER PUBLICATIONS

Y. Yau et al., "Solid Matrix Polymerization and Stereoisomeric Complexes of Poly(methyl Methacrylate)", *Journal of Polymer Science: Polymer Chemistry Edition*, vol. 23, 1985, pp. 813–828.

E.L. Feitsma et al., "Association of stereoregular poly(methyl methacrylates): 2. Formation of stereocomplex in bulk", POLYMER, vol. 16, (Jul. 1975), pp. 515–519.

K. Mizoguchi et al., "$CO_2$–induced crystallization of poly(ethylene terephthalate)", POLYMER, vol. 28, (Jul. 1987), pp. 1298–1302.

* cited by examiner

*Primary Examiner*—Allan R. Kuhns
(74) *Attorney, Agent, or Firm*—Sughrue Mion, PLLC

(57) ABSTRACT

Provided are a method for producing a crystalline methacrylic resin, the method comprising a step of bringing a mixture of an isotactic methyl methacrylate-type polymer and a syndiotactic methyl methacrylate-type polymer into contact with high pressure gas and a method for producing a plastic foam of the crystalline methacrylic resin, the method comprising a step of foaming the mixture. According to the method of the present invention, a crystalline methacrylic resin which is not limited in a form applicable to molded articles thereof and has high crystallinity and excellent solvent resistance can be obtained in a simple method and a plastic foam of the crystalline methacrylic resin can be obtained, the plastic foam embracing fine cells having an average cell diameter of about 10 $\mu$m or less and a cell number density of $10^9$ to $10^{15}$ cells/cm$^3$. Such a plastic foam is superior in the solvent resistance and in the mechanical properties such as impact resistance and bending strength.

14 Claims, No Drawings

METHOD FOR PRODUCING CRYSTALLINE METHACRYLIC RESIN AND PLASTIC FOAM

TECHNICAL FIELD OF THE INVENTION

The present invention relates to a method for producing a crystalline methacrylic resin, to a plastic foam made from the crystalline methacrylic resin and to a method for producing the plastic foam.

BACKGROUND ART

Methacrylic resins have excellent properties, that is, high transparency, weatherability and mechanical characteristics. Hence methacrylic resins are made into various forms for use in a wide range of applications including lighting fixtures, signboards, displays, construction materials, foam materials and optical tools such as lenses and optical disks.

In the meantime, it is well-known that when an isotactic poly(methyl methacrylate) (hereinafter referred to as IPMMA) is mixed with a syndiotactic poly(methyl methacrylate) (hereinafter referred to as SPMMA) in an appropriate condition, a crystalline methacrylic resin called a stereocomplex poly(methyl methacrylate) (hereinafter referred to as SCPMMA) is obtained.

Well-known methods for the production of such a crystalline methacrylic resin include (1) a method in which IPMMA is mixed with SPMMA in a specific solvent such as toluene, acetone and DMF, (2) a method in which a solid mixture consisting of IPMMA and SPMMA is heat-treated (Japan Chemical Society "Experimental Chemistry Lecture 28, Polymer Synthesis" pp129, lines 10–13 (1992), Maruzen, (3) a method in which IPMMA and SPMMA are respectively dissolved in methyl methacrylate, the resulting solutions are mixed with each other to obtain SCPMMA and thereafter methyl methacrylate is photo-polymerized to obtain poly(methyl methacrylate) containing SCPMMA (Japanese Patent Publication (JP-B) No. S47-14834) and (4) a method in which IPMMA is swollen using methyl methacrylate to conduct matrix polymerization thereby forming SCPMMA in the interface between them (H. Yau, and S. I. Stupp, J. Polym. Sci., Polym. Chem. Ed., 23, 813 (1985)). The crystalline methacrylic resin thus obtained is known to have higher solvent resistance than non-crystalline methacrylic resins (Japanese Patent Application Laid-Open (JP-A) No. H3-244651).

Applications of a methacrylic resin include use in products provided with a printed design or pattern on the surface thereof. For instance, a photoconductive plate made of a methacrylic resin is provided with a proper dot pattern on the surface thereof by means of screen printing to improve the luminance of the photoconductive plate. For printing in the above method, an organic solvent is usually used. In such a method, however, there is the case where the surface of the methacrylic resin is affected by the solvent with the result that a defect such as unclear printing is caused.

In the production of a decorative sheet in which the surface of a substrate, e.g., a metallic material is coated with a methacrylic resin film on which various designs are printed, the surface of the decorative plate is usually washed using an alcoholic solvent in a finishing step to remove an organic solvent used for printing. In this case, cracks are sometimes generated in the methacrylic resin film on account probably of residual stress in the coating stage when the surface of the decorative plate is washed with the alcoholic solvent.

For the applications as above, it is considered to apply a crystalline methacrylic resin, such as SCPMMA as aforementioned, having high solvent resistance. However, the foregoing well-known production methods (1)–(4) have the following problems and hence a crystalline methacrylic resin is not sufficiently obtained. For example, a crystalline methacrylic resin obtained in the above method (1) is reduced in crystallinity and allows a solvent to remain unremoved in a molded article thereof in which the solvent adversely affects the solvent resistance so that it can be used with difficulty for the purpose of improving the solvent resistance. In the above method (2), in the case of using IPMMA and SPMMA which have a relatively low molecular weight and high stereoregularity, crystallization of the resulting methacrylic resin may proceed rapidly but raw materials thereof are expensive. On the other hand, in the case of using IPMMA and SPMMA which have a relatively high molecular weight and low stereoregularity, crystallization of the resulting methacrylic resin may proceed with difficulty. The above methods (1), (3) and (4) have problems such that there is a limitation in a form of a molded article to which the resulting crystalline methacrylic resin can be applied.

SUMMARY OF THE INVENTION

Under these circumstances, the inventors of the present invention have made earnest studies to find a method for producing a crystalline methacrylic resin, which is not limited in a form applicable to a molded article thereof and has high crystallinity and excellent solvent resistance, in a simple process and found that a crystalline methacrylic resin which attains all of the above objects can be obtained when a mixture of IPMMA and SPMMA is treated in a specific condition. Also, the inventors have found that when a mixture of IPMMA and SPMMA is treated in a specific condition to foam the mixture, a plastic foam of crystalline methacrylic resin can be obtained in which the plastic foam exhibits high solvent resistance, embraces fine cells having an average cell diameter of about 10 $\mu$m or less and a cell number density of $10^9$ to $10^{15}$ cells/cm$^3$ and possesses excellent mechanical properties such as high impact resistance and bending strength. Thus the present invention has been completed.

According to a first aspect of the present invention, there is provided a method for producing a crystalline methacrylic resin, which comprises a step of bringing a mixture of an isotactic methyl methacrylate-type polymer and a syndiotactic methyl methacrylate-type polymer into contact with high pressure gas.

According to a second aspect of the present invention, there is provided a method for producing a plastic foam of a crystalline methacrylic resin, which comprises a step of bringing a mixture of an isotactic methyl methacrylate-type polymer and a syndiotactic methyl methacrylate-type polymer into contact with high pressure gas, followed by foaming the mixture.

According to a third aspect of the present invention, there is provided a plastic foam of a crystalline methacrylic resin, the plastic foam embracing fine cells having an average cell diameter of about 10 $\mu$m or less and a cell number density of $10^9$ to $10^{15}$ cells/cm$^3$.

DETAIL DESCRIPTION OF THE INVENTION

The isotactic methyl methacrylate-type polymer used in the present invention means a polymer having a methyl methacrylate unit as a major component and the isotacticity (of its methyl methacrylate unit chain) of about 50% or more and preferably about 80% or more, in terms of triad expression. The isotactic methyl methacrylate-type polymer used in the present invention may be a homopolymer of a methyl methacrylate monomer and a copolymer of i) a monomer copolymerizable with a methyl methacrylate monomer and ii) a methyl methacrylate monomer.

The above-mentioned monomer copolymerizable with a methyl methacrylate monomer may be a well-known one and no particular limitation is imposed on the monomer. Examples of the monomer may include methacrylates such as ethyl methacrylate, butyl methacrylate, cyclohexyl methacrylate, 2-ethylhexyl methacrylate and 2-hydroxyethyl methacrylate, acrylates such as methyl acrylate, ethyl acrylate, butyl acrylate, cyclohexyl acrylate, 2-ethylhexyl acrylate and 2-hydroxyethyl acrylate, unsaturated acids such as methacrylic acid and acrylic acid, monofunctional monomers such as acrylonitrile, methacrylonitrile and styrene and polyfunctional monomers such as ethylene glycol dimethacrylate and trimethylpropane trimethacrylate. When the monomer among them is used to obtain the isotactic methyl methacrylate-type polymer in the present invention, the monomer is used singly or in combination of two or more, together with a methyl methacrylate monomer.

An amount of the copolymerizable monomer to be used to obtain the isotactic methyl methacrylate-type polymer in the present invention may be appropriately determined depending on the physical properties of a desired crystalline methacrylic resin and there is no particular limitation to the amount. The amount is preferably about 30% by weight or less and more preferably within the range of from 0 to about 20% by weight based on the total amount of the monomers to be used. An excessive amount of the copolymerizable monomer gives an opportunity for difficult formation of a crystalline methacrylic resin in some cases.

No particular limitation is imposed on a method for producing the isotactic methyl methacrylate-type polymer in the present invention and the isotactic methyl methacrylate-type polymer may be produced in a conventionally well-known method. For instance, it may be obtained by anion-polymerizing a methyl methacrylate monomer by using a Grignard's reagent as a polymerization initiator (see, JP-A Nos. S61-179210 and S61-176617).

The syndiotactic methyl methacrylate-type polymer used in the present invention means a polymer having a methyl methacrylate unit as a major component and the syndiotacticity (of the methyl methacrylate unit chain) of about 50% or more in terms of triad expression. The syndiotactic methyl methacrylate-type polymer used in the present invention may be a homopolymer of a methyl methacrylate monomer and a copolymer of i) a monomer copolymerizable with a methyl methacrylate monomer and ii) a methyl methacrylate monomer, like the aforementioned isotactic methyl methacrylate-type polymer.

An amount of the copolymerizable monomer to be used to obtain the syndiotactic methyl methacrylate-type polymer in the present invention may be appropriately determined depending on the physical properties of a desired crystalline methacrylic resin and there is no particular limitation to the amount. The amount is preferably about 30% by weight or less and more preferably within the range of from 0 to about 20% by weight based on the total amount of the monomers to be used. An excessive amount of the copolymerizable monomer gives an opportunity for difficult formation of a crystalline methacrylic resin in some cases.

No particular limitation is imposed on a method for producing a syndiotactic methyl methacrylate-type polymer in the present invention and the syndiotactic methyl methacrylate-type polymer may be produced in a conventionally well-known method. For instance, it may be obtained by anion-polymerizing a methyl methacrylate monomer by using, for example, an organic aluminum compound or an organic lanthanide complex as an initiator (see, JP-B No. H6-89054 and JP-A No. H3-263412). The syndiotactic methyl methacrylate-type polymer can also be obtained by polymerizing a methyl methacrylate monomer by using a known radical polymerization initiator. Examples of the radical polymerization initiator may include organic peroxide-type initiators such as benzoyl peroxide, di-t-butyl peroxide and t-butylperoxy-2-ethyl hexaate; azo-type initiators such as 2,2'-azobisisobutyronitrile and 2,2'-azobis(2,4-dimethylvaleronitrile); known redox-type initiators obtained by combining a peroxide initiator with a reducing compound such as amines and mercaptans as major components; and photopolymerization initiators made from benzoin, benzoin ethers, 1-hydrohexyl phenyl ketone, benzyldimethylketal, acylphosphenoxide, benzophenone, Michler's ketone, thioxanthone or the like and, if required, a light-sensitizing agent.

A method for producing a crystalline methacrylic resin in the present invention comprises a step of bringing a mixture of an isotactic methyl methacrylate-type polymer and a syndiotactic methyl methacrylate-type polymer into contact with high pressure gas. As a method of producing the mixture of an isotactic methyl methacrylate-type polymer and a syndiotactic methyl methacrylate-type polymer, a well-known method may be used and no particular limitation is imposed to the method. Examples of the method may include a method in which the both is mixed with each other in a solvent, such as chloroform and methylene chloride, which can solve the crystalline methacrylic resin and a method in which the isotactic methyl methacrylate-type polymer and the syndiotactic methyl methacrylate-type polymer are melted and kneaded. The resulting mixture may be crystallized in part during the mixing step or may contain a part of the solvent used in the mixing step.

A mixing ratio by weight of the isotactic methyl methacrylate-type polymer to the syndiotactic methyl methacrylate-type polymer in the mixture (polymer mixture) obtained by the above mixing is generally about 1:99 to about 99:1, preferably about 10:90 to about 90:10 and more preferably about 15:85 to about 85:15. As to each amount of the isotactic methyl methacrylate-type polymer and the syndiotactic methyl methacrylate-type polymer, the larger the amount of one polymer is in contrast to that of another polymer, specifically, the larger the difference in amount between the both is, the lower the solvent resistance of the resulting crystalline methacrylic resin becomes. Also, in the plastic foam to be obtained from such a crystalline methacrylic resin, it tends to be difficult to produce cells having a fine cell diameter.

No particular limitation is placed upon the shape of the polymer mixture and examples of the shape of the mixture may include a filmy form, plate-like form and desired shapes of molded articles.

In the present invention, a polymer mixture comprising the isotactic methyl methacrylate-type polymer and the syndiotactic methyl methacrylate-type polymer is prepared and then the polymer mixture is brought into contact with high pressure gas to allow the polymer mixture to contain the gas.

As the gas which is brought into contact with the polymer mixture, conventionally well-known gases may be used. Examples of the gas may include carbon dioxide, nitrogen, argon, hydrogen, oxygen, butane, propane and air. These gases may be used either singly or in combination of two or more. It is particularly preferred to use a gas containing about 50% by volume or more of carbon dioxide from the point that the gas is inert to a resin to be treated, is highly soluble in a methyl methacrylate-type polymer and can be easily handled.

A pressure of the high pressure gas to be brought into contact with the polymer mixture may be appropriately determined depending on the physical properties of a desired crystalline methacrylic resin and is generally about 0.2 MPa or more and preferably about 1 MPa or more. When the pressure is low, the melting point and crystallinity of the resulting crystalline methacrylic resin become lower whereas when the pressure is high, the melting point and crystallinity of the resulting crystalline methacrylic resin become higher. Also, when the pressure is low, the diameter of a cell in the resulting plastic foam tends to be larger whereas when the pressure is high, the cell diameter of a cell in the resulting plastic foam tends to be smaller. There is no upper limit of the pressure and the pressure may be up to about 40 MPa although it is determined mainly, for instance, from the economical viewpoint.

No particular limitation is imposed on a temperature at which the high pressure gas is brought into contact with the polymer mixture and the temperature may be appropriately determined depending on the physical properties of a desired crystalline methacrylic resin. The temperature is usually about 0 to about 300° C. and preferably about 0 to about 200° C. When the temperature is low, the melting point of the resulting crystalline methacrylic resin becomes lower and the diameter of a cell in the resulting plastic foam becomes small. When the temperature is too high, the resulting resin is likely to be decomposed and it tends to be difficult for the gas to dissolve in the methyl methacrylate-type polymer.

When the high pressure gas is brought into contact with the polymer mixture, it is preferred that the high pressure gas is in a supercritical condition. That which the high pressure gas is in a supercritical condition means that each of the temperature and pressure of the high pressure gas is above the critical point thereof. By changing the pressure under the supercritical condition, the state of the gas can be changed in wide range from a state close to a vapor to a state close to a liquid with respect to the density, viscosity and diffusion coefficient. As is well-known, the critical point of gas differs depending upon the type of gas. For instance, in the case of carbon dioxide, the temperature is 304.2 K and the pressure is 7.4 MPa and in the case of nitrogen, the temperature is 126.2 K and the pressure is 3.4 MPa. When two or more types of gas are mixed with each other, a critical point also exists corresponding to the types of the utilized gas and the mixing ratio to be applied.

There is no particular limitation upon the time required to bring high pressure gas into contact with the polymer mixture. The time may be appropriately determined depending on the shape of the methacrylic resin to be treated in contact with the gas and is usually about 0.1 second to about 7 days and preferably about 30 seconds to about 12 hours. When the time is shorter than the above range, there is the case where only a shallow portion of the surface layer is crystallized. There is no upper limit of the time required for the contact treatment. However, even if the contact time is excessively long, no effect which is worth the time is obtained and hence the polymer mixture is treated usually in the above time range in view of operational efficiency.

No particular limitation is imposed on a method for bringing the polymer mixture into contact with the high pressure gas and any method may be adopted as far as the polymer mixture is in the condition allowing the mixture to be in contact with the high pressure gas under a high pressure gas atmosphere. There is no limitation to its measures. Examples of the method may include a method in which high pressure gas is sealed into a pressure container charged with the polymer mixture and a method in which atmospheric pressure gas is sealed into a pressure container charged with the polymer mixture and thereafter the atmosphere in the container is set to a high pressure by an operation such as heating.

By bringing the polymer mixture into contact with high pressure gas, the gas is embraced in the polymer mixture. Specific examples of the contact method include a method in which a pressure container is charged with the polymer mixture having an optional shape, for instance, a filmy form, plate-like form or desired shapes of the molded articles and gas is introduced into the entire container to bring the polymer mixture into contact with the high pressure gas to thereby allow the gas to be contained in the polymer mixture and a method in which the polymer mixture in a molten state is introduced into an apparatus such as a pressure container, extrusion molding machine or injection molding machine and high pressure gas is injected into the polymer mixture to thereby allow the gas to be contained in the polymer mixture polymer mixture.

The polymer mixture which has been brought into contact with the high pressure gas may be then taken out after the pressure in the container or the like is lowered to atmospheric pressure. At this time, if the pressure is decreased slowly to atmospheric pressure, a non-foamed transparent crystalline methacrylic resin can be obtained. On the other hand, if the pressure is decreased quickly, a plastic foam of a crystalline methacrylic resin can be obtained.

In a conventional method in which a mixture of IPMMA and SPMMA having a relatively high molecular weight and low stereoregularity is heat-treated, the crystallinity of the resulting methacrylic resin is 2% at most. On the contrary, in the method of the present invention in which the polymer mixture is brought into contact with high pressure gas, a crystalline methacrylic resin having a crystallinity as high as generally 3% or more, preferably 5% or more and more preferably exceeding 10% can be obtained. The crystalline methacrylic resin obtained according to the present invention has remarkably high solvent resistance.

A plastic foam of the crystalline methacrylic resin obtained by foaming the polymer mixture has such a high crystallinity as aforementioned, embraces fine cells with a small average cell diameter and has large cell number density. The average cell diameter of cells contained in the plastic foam is generally about 10 $\mu$m or less, preferably about 5 $\mu$m or less and more preferably about 2 $\mu$m or less. The cell number density of the cells is generally about $10^9$ to $10^{15}$ cells/cm$^3$. The plastic foam is not only superior in the solvent resistance to conventionally known plastic foams of methyl methacrylate resin but also has high mechanical properties such as high impact resistance and bending strength compared with plastic foams having the same expansion ratio.

As is explained in detail, according to the present invention, a crystalline methacrylic resin and a plastic foam thereof which have high crystallinity and excellent solvent resistance can be obtained in an extremely simple method. The present invention, also, unlike the aforementioned conventional methods (1), (3) and (4), is not limited by the shapes of the molded articles and can be used in various applications such as lighting fixtures, signboards, displays, construction materials, foam materials and optical tools such as lenses and optical disks, indicating that the present invention has high utility value in industries.

EXAMPLES

The present invention is described in more detail by following Examples, which should not be construed as a limitation upon the scope of the present invention.

Measuring methods and tests for physical properties which were used in the following Examples are as follows.

Number average molecular weight:

Using gel permeation chromatography (model 150-CV, manufactured by Waters Co., Ltd.) and THF as a solvent therein, molecular weight and molecular weight distribution of a test sample was measured at 40° C. In order to determine the number average molecular weight of the test sample, a calibration curve based on that of a standard sample, poly(methyl methacrylate), was used.

Stereoregularity

Nuclear magnetic resonance spectrum of a test sample was measured at 110° C. using a proton nuclear magnetic resonance spectrum measuring instrument (model XL-200, manufactured by Varian Co. Ltd.) and a nitrobenzene-d5 as a solvent therein. Each stereoregularity of an isotactic methacrylic resin and syndiotactic methacrylic resin was indicated by a triad expression (mm) of isotacticity and a triad expression (rr) of syndiotacticity, respectively.

Melting Point and Crystallinity

An endothermic peak of a test sample was measured using a differential scanning calorimeter (model SSC-5880II, manufactured by Seiko Instruments Inc.) at a temperature increasing rate of 10° C./min. A melting point (Tm) of a test sample was determined from the maximum of the melting endothermic peak of the sample. Also, a heat of melting ($\Delta H$) was calculated from the area showing the endothermic peak to calculate the crystallinity of the test sample provided that the $\Delta H$ of 100% crystallinity was defined as 58 J/g (K. Konnecke, and G. Rehage, Makromol. Chem., 184, 2679–2691 (1983)).

Solvent Resistance Test

When the test sample is filmy, a filmy test specimen of which size was 20 mm by 20 mm square was made and used in a solvent resistance test. Acetone was applied to a surface of the test specimen to evaluate the solvent resistance of the test specimen by whether or not a craze was generated after the application. A test sample on which no craze was generated was rated as "◯", which means that the test sample has high solvent resistance, and a test sample on which a craze was generated was rated as "×", which means that the test sample has low solvent resistance.

When the test sample is a plastic foam, acetone was dripped on a surface of the test sample and dried at room temperature to evaluate a solvent resistance of the test sample by the size of the trace of the drop. A test sample on which the trace was so small that it was not obvious was rated as "◯", which means that the test sample has high solvent resistance, a test sample on which the trace was slightly larger was rated as "Δ" and a test sample on which the trace was so large that it was obvious was rated as "×", which means that the test sample has low solvent resistance.

Average cell diameter and cell number density of cells:

An SEM photograph of a section of a plastic foam which was taken by a scanning electron microscope (model JSM-840A, manufactured by JEOL Ltd.) was treated statistically by using an image processing software (Image Analyzer V10LAB for Windows 95, manufactured by Toyobo Co., Ltd.) to calculate the average value of the diameter of a cell on the section of the plastic foam. The average value was defined as an average cell diameter D of a cell for the test sample. In addition, a cell number density N was calculated from the following formula.

$$N=(n/A)^{3/2}/(1-4/3\pi(D/2)^3 \cdot (n/A)^{3/2})$$

(wherein N represents a cell number density, A represents an area of a statistically treated region, n represents the number of cells in A and D represents an average cell diameter).

Example 1

15 parts by weight of an isotactic methyl methacrylate-type polymer (number average molecular weight: 36,200, mm: 81%) obtained by anionic polymerization and 15 parts by weight of a syndiotactic methyl methacrylate-type polymer (number average molecular weight: 55,800, rr: 57%) obtained by radical polymerization were dissolved in 70 parts by weight of methylene chloride. The resulting solution was spread on a polyethylene terephthalate resin film and dried at a room temperature for one hour in a vacuum drier to obtain a filmy mixture (film) of the isotactic methyl methacrylate-type polymer and the syndiotactic methyl methacrylate-type polymer in which the filmy mixture had an average thickness of 113 μm. A scanning calorimeter was used to measure the crystallinity of the film to find that Tm was 122.8° C. and the crystallinity was 0.7%.

The film was placed in a pressure autoclave, which was then filled with 30° C. carbon dioxide having a pressure of 5 MPa. After the film was kept at 30° C. with 5 MPa for 6 hours, the pressure in the pressure autoclave was decreased to atmospheric pressure at a pressure decreasing rate of 5 MPa/h and then the film was taken out.

The scanning calorimeter was used to measure Tm and crystallinity of the resulting film. Also, a test for the solvent resistance of the resulting film was conducted. The results are shown in Table 2.

Examples 2 to 11

Each film was obtained in the same manner as in Example 1 except that the temperature and pressure of carbon dioxide to be filled in the pressure autoclave and the retention time required for carbon dioxide to be in contact with the filmy polymer mixture under pressure were respectively changed to those shown in Table 1.

A differential scanning calorimeter was used to measure Tm and crystallinity of the resulting film. Also, a test for the solvent resistance of the resulting film was conducted. The results are shown in Table 2.

Comparative Example 1

A filmy polymer mixture was obtained in the same manner as in Example 1 and Tm and crystallinity thereof were measured using the differential scanning calorimeter. Also, a test for a solvent resistance of the filmy polymer mixture was conducted. The results are shown in Table 2.

Comparative Examples 2 to 5

Each film was obtained in the same manner as in Example 1 except that the filmy polymer mixture was respectively left in an air oven under atmospheric pressure at the temperature and for the period of time shown in Table 1 in place of the process of Example 1 in which the filmy polymer mixture was placed in a pressure autoclave, the inside of the autoclave was kept under a high pressure carbon dioxide atmosphere and thereafter the pressure was returned to atmospheric pressure.

The scanning calorimeter was used to measure Tm and crystallinity of the resulting film. Also, a test for the solvent resistance of the resulting film was conducted. The results are shown in Table 2.

TABLE 1

|  | Temperature (° C.) | Pressure (MPa) | Time (Hour) |
|---|---|---|---|
| Example 1 | 30 | 5 | 6 |
| Example 2 | 30 | 5 | 12 |
| Example 3 | 50 | 5 | 6 |
| Example 4 | 50 | 5 | 12 |
| Example 5 | 70 | 5 | 6 |
| Example 6 | 70 | 5 | 12 |
| Example 7 | 50 | 10 | 6 |
| Example 8 | 50 | 10 | 12 |
| Example 9 | 70 | 10 | 6 |
| Example 10 | 70 | 10 | 12 |
| Example 11 | 70 | 20 | 12 |
| Comparative Example 1 | — | — | — |
| Comparative Example 2 | 50 | Atmospheric pressure*1 | 6 |
| Comparative Example 3 | 50 | Atmospheric pressure*1 | 12 |
| Comparative Example 4 | 70 | Atmospheric pressure*1 | 6 |
| Comparative Example 5 | 70 | Atmospheric pressure*1 | 12 |

*1About 0.1 MPa

TABLE 2

|  | Tm (° C.) | Crystallinity (%) | Solvent resistance test*2 |
|---|---|---|---|
| Example 1 | 118.3 | 12.4 | ○ |
| Example 2 | 118.7 | 12.6 | ○ |
| Example 3 | 121.0 | 12.1 | ○ |
| Example 4 | 125.6 | 11.7 | ○ |
| Example 5 | 132.0 | 11.4 | ○ |
| Example 6 | 132.8 | 13.1 | ○ |
| Example 7 | 141.6 | 22.6 | ○ |
| Example 8 | 141.1 | 24.0 | ○ |
| Example 9 | 148.0 | 18.6 | ○ |
| Example 10 | 148.0 | 20.0 | ○ |
| Example 11 | 157.6 | 19.5 | ○ |
| Comparative Example 1 | 122.8 | 0.7 | X |
| Comparative Example 2 | 123.8 | 2.2 | X |
| Comparative Example 3 | 123.3 | 1.4 | X |
| Comparative Example 4 | 124.2 | 1.2 | X |
| Comparative Example 5 | 123.8 | 1.0 | X |

*2In the solvent resistance test, "○" shows that no craze was generated on the film and "X" shows that a craze was generated.

Example 12

10 parts by weight of an isotactic methyl methacrylate-type polymer (number average molecular weight: 36,200, mm: 81%) obtained by anionic polymerization and 90 parts by weight of a syndiotactic methyl methacrylate-type polymer (number average molecular weight: 55,800, rr: 57%) obtained by radical polymerization were melted and kneaded in a single-axial extruder to obtain a pellet mixture. The resulting pellet mixture was pressed at 220° C. to obtain a sheet with a thickness of about 1 mm.

The sheet was placed in a pressure autoclave, which was then filled with 40° C. carbon dioxide having a pressure of 20 MPa. After the sheet was kept at the same temperature with the same pressure for 5 hours, the carbon dioxide therein was exhausted in 10 seconds to decrease the pressure in the container to atmospheric pressure, thereby obtaining a plastic foam.

The differential scanning calorimeter was used to measure Tm and crystallinity of the resulting plastic foam. Also, by the image processing of SEM photograph of a section of the plastic foam, the average cell diameter D and cell number density N of cells of the plastic foam were calculated. The results are shown in Table 5.

Examples 13 to 27 and Comparative Examples 6 to 9

Each sheet having the thickness shown in Table 3 was obtained in each of Examples and Comparative Examples in the same manner as in Example 12 except that respective amount of the isotactic methyl methacrylate-type polymer and the syndiotactic methyl methacrylate-type polymer was altered from 10 parts by weight and 90 parts by weight to those shown in Table 3. Also, each plastic foam was obtained in each of Examples and Comparative Examples in the same manner as in Example 12 except that the temperature and pressure of carbon dioxide filled in the pressure autoclave were altered from 40° C. and 20 MPa to those shown in Table 4.

The differential scanning calorimeter was used to measure Tm and crystallinity of the resulting plastic foam. Also, by the image processing of SEM photograph of a section of the plastic foam, the average cell diameter D and cell number density N of cells of the plastic foam were calculated. The results are shown in Table 5.

TABLE 3

| Sample No. | Thickness of sheet (mm)*3 | Amount of isotactic methyl methacrylate type polymer (parts by weight) | Amount of syndiotactic methyl methacrylate type polymer (parts by weight) |
|---|---|---|---|
| Comparative Examples 6, 7, 8 and 9 | 1 | About 0.6 | 0 | 100 |
| Examples 12, 16, 20 and 24 | 2 | About 1 | 10 | 90 |
| Examples 13, 17, 21 and 25 | 3 | About 1 | 33 | 67 |
| Examples 14, 18, 22 and 26 | 4 | About 1.5 | 50 | 50 |
| Examples 15, 19, 23 and 27 | 5 | About 1.1 | 66 | 34 |

*3It is considered that because a sufficient period of time was taken for the impregnation with carbon dioxide, the thickness of the sheet has no influence on the test results.

TABLE 4

| | Number of operational condition | Temperature (° C.) | Pressure (MPa) |
|---|---|---|---|
| Examples 12 to 15 and Comparative Example 6 | 1 | 40 | 20 |
| Examples 16 to 19 and Comparative Example 7 | 2 | 40 | 35 |
| Examples 20 to 23 and Comparative Example 8 | 3 | 60 | 20 |
| Examples 24 to 27 and Comparative Example 9 | 4 | 60 | 35 |

TABLE 5

| | Sample No. | Number of operational condition | Tm (° C.) | Crystallinity (%) | Solvent resistance test[*4] | Average cell diameter D ($\mu$m) | Cell number density N (cells/cm$^3$) |
|---|---|---|---|---|---|---|---|
| Comparative Example 6 | 1 | 1 | Non-crystallized | | X | 5.3 | $1.7 \times 10^9$ |
| Example 12 | 2 | 1 | 147 | 7.6 | Δ | 2.4 | $5.5 \times 10^9$ |
| Example 13 | 3 | 1 | 141 | 30.7 | ○ | 2.7 | $4.2 \times 10^9$ |
| Example 14 | 4 | 1 | 137 | 24.6 | ○ | 2.9 | $4.2 \times 10^9$ |
| Example 15 | 5 | 1 | 136 | 17.6 | ○ | 3.4 | $7.7 \times 10^9$ |
| Comparative Example 7 | 1 | 2 | Non-crystallized | | X | 0.17 | $5.8 \times 10^{13}$ |
| Example 16 | 2 | 2 | 151 | 9.3 | Δ | 0.096 | $2.8 \times 10^{14}$ |
| Example 17 | 3 | 2 | 146 | 26.0 | ○ | 0.088 | $4.0 \times 10^{14}$ |
| Example 18 | 4 | 2 | 142 | 27.9 | ○ | 0.12 | $1.4 \times 10^{14}$ |
| Example 19 | 5 | 2 | 139 | 20.5 | ○ | 0.21 | $3.2 \times 10^{13}$ |
| Comparative Example 8 | 1 | 3 | Non-crystallized | | X | 7.3 | $1.3 \times 10^9$ |
| Example 20 | 2 | 3 | 158 | 6.6 | Δ | 3.2 | $5.6 \times 10^9$ |
| Example 21 | 3 | 3 | 154 | 13.3 | ○ | 2.0 | $2.1 \times 10^{10}$ |
| Example 22 | 4 | 3 | 148 | 16.2 | ○ | 3.1 | $1.1 \times 10^{10}$ |
| Example 23 | 5 | 3 | 147 | 13.8 | ○ | 4.9 | $4.7 \times 10^9$ |
| Comparative Example 9 | 1 | 4 | Non-crystallized | | X | 1.8 | $9.5 \times 10^{10}$ |
| Example 24 | 2 | 4 | 163 | 7.1 | Δ | 0.50 | $2.2 \times 10^{12}$ |
| Example 25 | 3 | 4 | 156 | 19.7 | ○ | 0.26 | $2.1 \times 10^{13}$ |
| Example 26 | 4 | 4 | 151 | 20.3 | ○ | 0.68 | $1.6 \times 10^{12}$ |
| Example 27 | 5 | 4 | 150 | 15.9 | ○ | 2.0 | $5.8 \times 10^{10}$ |

[*4]In the solvent resistance test, "○" shows that the trace of a drop of acetone was so small that it is not obvious, "Δ" shows that the trace was slightly larger and "X" shows that the trace was so large that it was obvious.

What is claimed is:

1. A method for producing a crystalline methacrylic resin, which comprises a step of bringing a mixture of an isotactic methyl methacrylate-type polymer and a syndiotactic methyl methacrylate-type polymer into contact with high pressure gas.

2. A method for producing a plastic foam of a crystalline methacrylic resin, which comprises a step of bringing a mixture of an isotactic methyl methacrylate-type polymer and a syndiotactic methyl methacrylate-type polymer into contact with high pressure gas, followed by foaming the mixture.

3. A method for producing a crystalline methacrylic resin according to claim 1, wherein the high pressure gas to be brought into contact contains carbon dioxide in an amount of 50% by volume or more.

4. A method for producing a crystalline methacrylic resin according to any one of claim 1 to claim 3, wherein the pressure of the high pressure gas to be brought into contact is 1 MPa or more.

5. A method for producing a crystalline methacrylic resin according to claim 4, wherein the temperature at which the high pressure gas is brought into contact is 0° C. or more.

6. A method for producing a crystalline methacrylic resin according to claim 5, wherein the high pressure gas to be brought into contact is in a supercritical condition.

7. A method for producing a crystalline methacrylic resin according to claim 1, which further comprises a step of shaping the mixture into a form selected from the group consisting of a molten form, a filmy form, a plate form and a molded article form.

8. A plastic foam of a crystalline methacrylic resin, wherein the crystalline methacrylic resin comprises a mixture of an isotactic methyl methacrylate polymer and a syndiotactic methyl methacrylate polymer, and wherein the plastic foam embraces fine cells having an average cell diameter of about 10 $\mu$m or less and a cell number density of $10^9$ to $10^{15}$ cells/cm$^3$.

9. A plastic foam of a crystalline methacrylic resin according to claim 8, wherein the plastic foam is obtained by bringing a mixture of an isotactic methyl methacrylate-type polymer and a syndiotactic methyl methacrylate-type polymer into contact with high pressure gas, followed by foaming the mixture.

10. A method for producing a crystalline methacrylic resin according to claim 2, wherein the high pressure gas to be brought into contact contains carbon dioxide in an amount of 50% by volume or more.

11. A method for producing a crystalline methacrylic resin according to claim 10, wherein the pressure of the high pressure gas to be brought into contact is 1 Mpa or more.

12. A method for producing a crystalline methacrylic resin according to claim 10, wherein the temperature at which the high pressure gas is brought into contact is 0° C. or more.

13. A method for producing a crystalline methacrylic resin according to claim 10, wherein the high pressure gas to be brought into contact is in a supercritical condition.

14. A method for producing a crystalline methacrylic resin according to claim 10, which further comprises a step of shaping the mixture into a form selected from the group consisting of a molten form, a filmy form, a plate form and a molded article form.

* * * * *